4 Sheets—Sheet 1.
T. HYATT.
Assignor to E. A. L. HYATT, (late E. A. LAKE.)
ILLUMINATING ROOFS AND ROOF PAVEMENTS.
No. 9,883. Reissued Sept. 27, 1881.
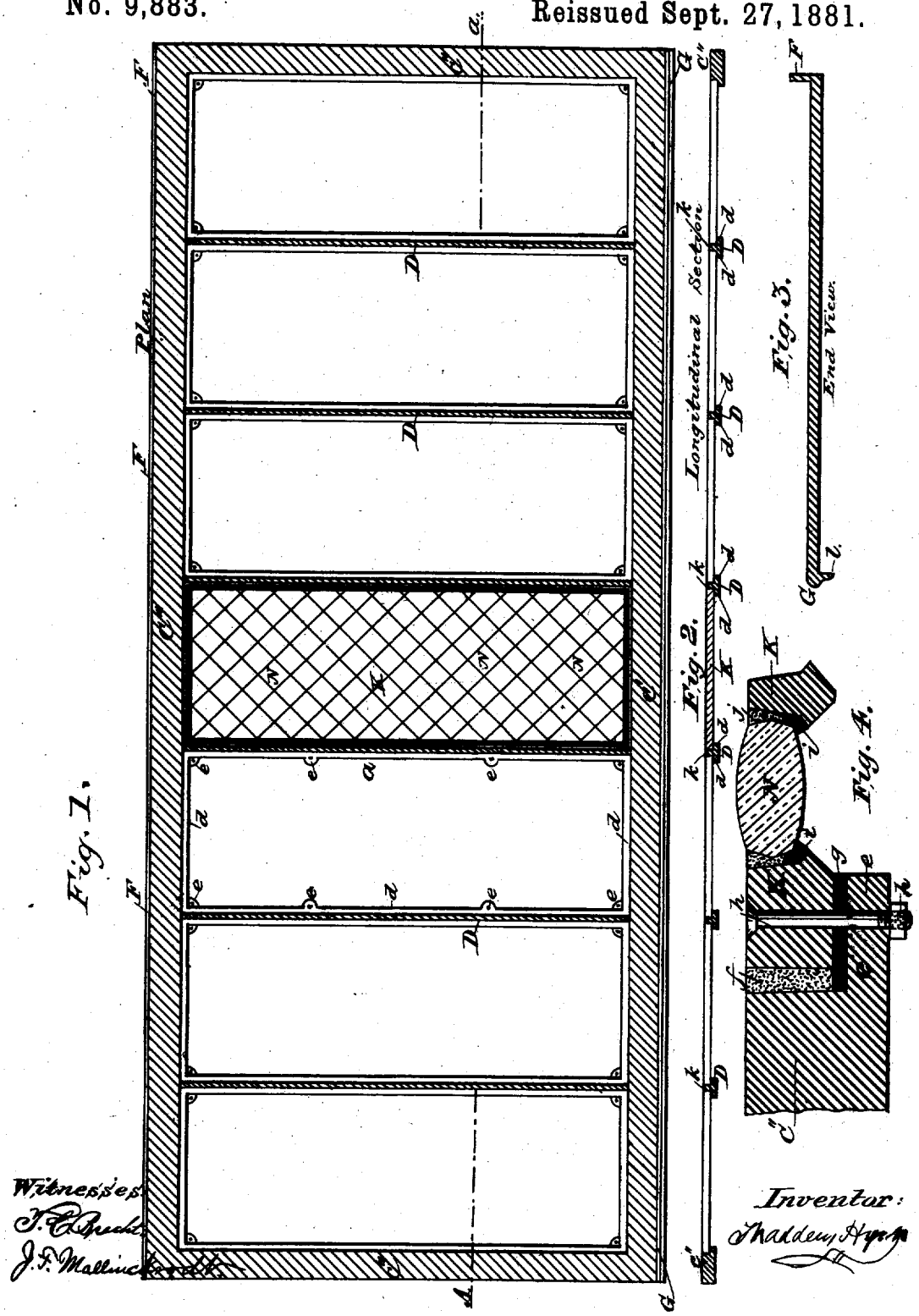
Witnesses:
T. C. Brecht
J. F. Mallinckrodt
Inventor:
Thaddeus Hyatt
N. PETERS, Photo-Lithographer, Washington, D. C.

4 Sheets—Sheet 2.
T. HYATT.
Assignor to E. A. L. HYATT, (late E. A. LAKE.)
ILLUMINATING ROOFS AND ROOF PAVEMENTS.
No. 9,883. Reissued Sept. 27, 1881.
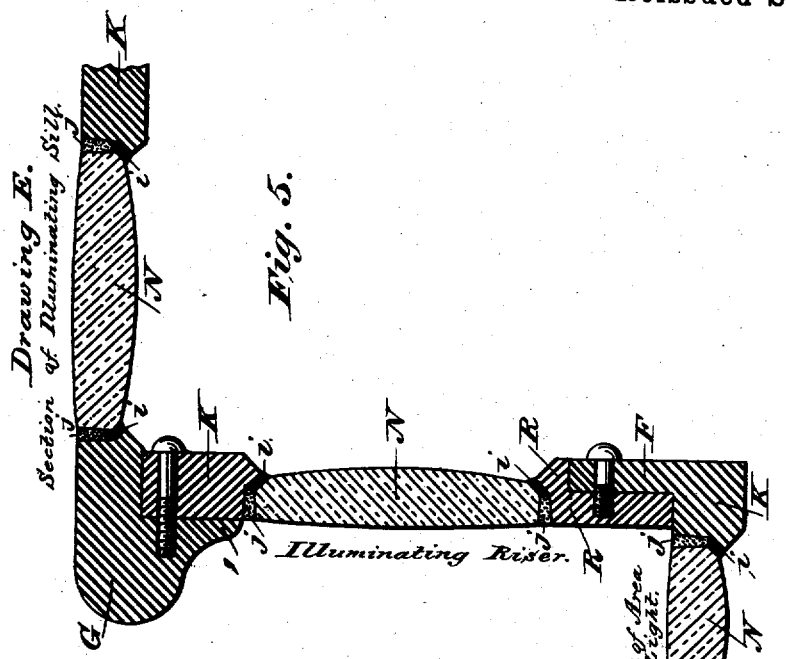
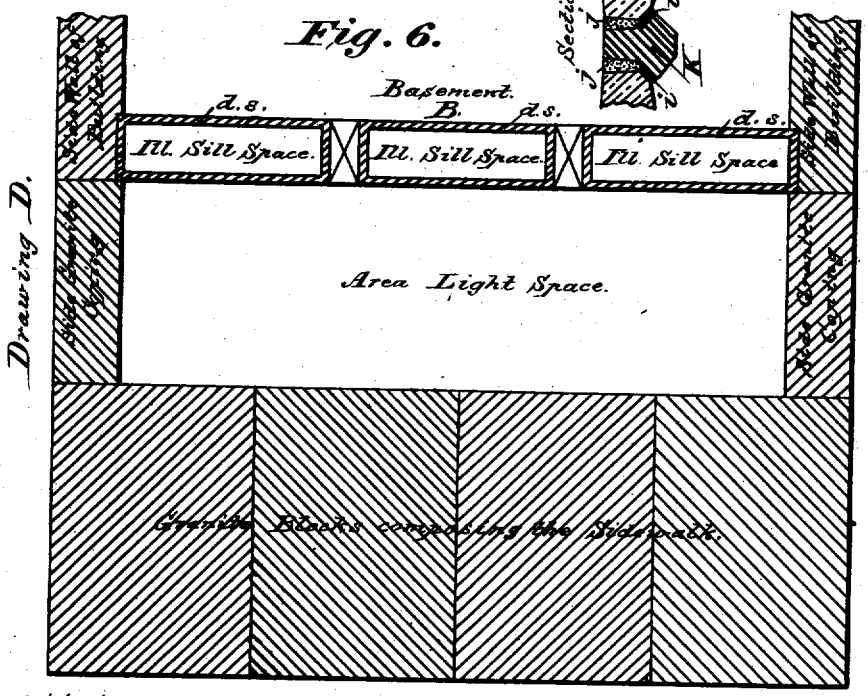
Witnesses:
T. C. Brecht
J. F. Mallinckrodt
Inventor:
Thaddeus Hyatt
PETERS, Photo-Lithographer, Washington, D. C.

4 Sheets—Sheet 3.
T. HYATT.
Assignor to E. A. L. HYATT, (late E. A. LAKE.)
ILLUMINATING ROOFS AND ROOF PAVEMENTS.
No. 9,883. Reissued Sept. 27, 1881.
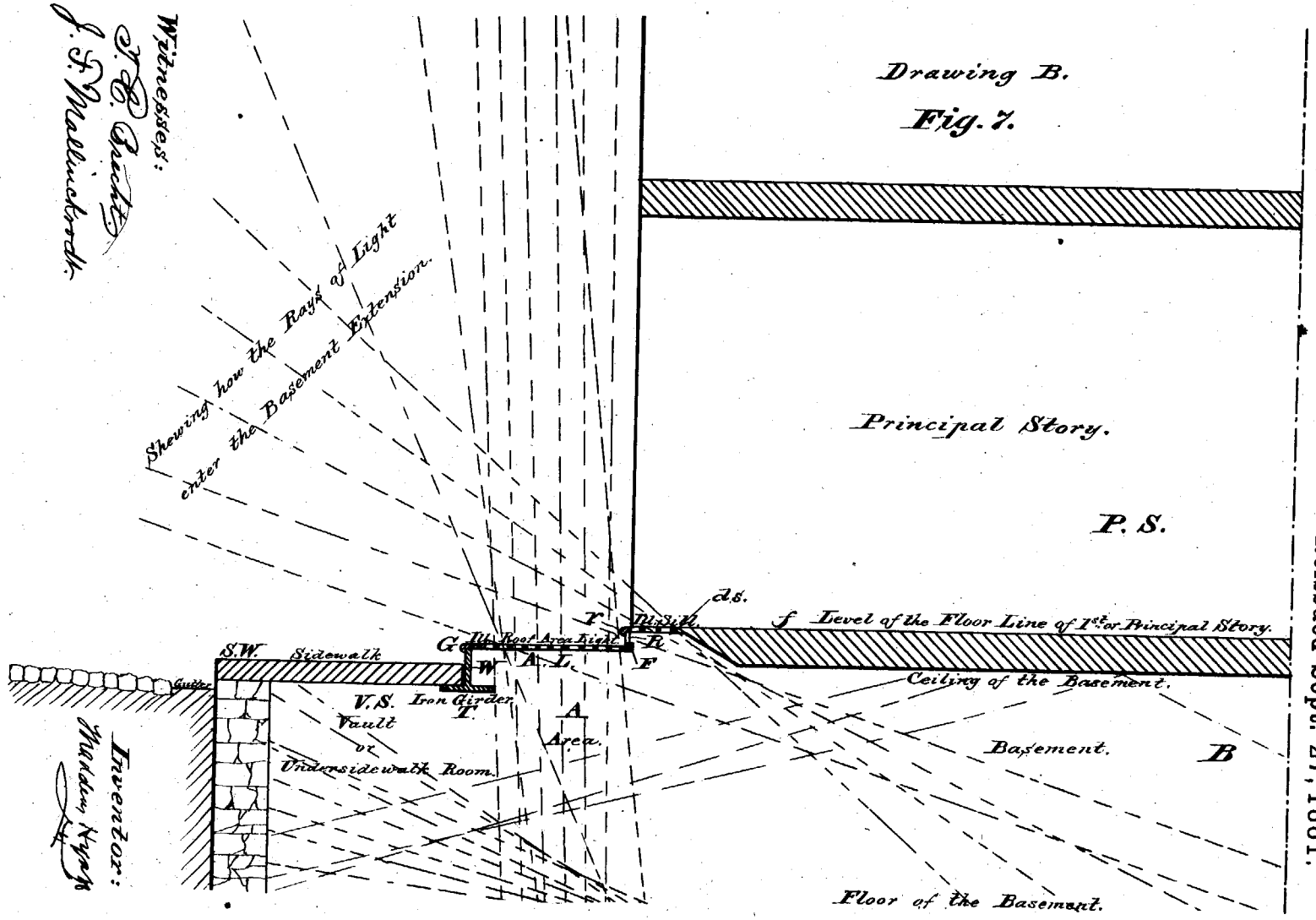
Witnesses:
T. C. Brecht
J. F. Mallinckrodt.
Inventor:
Madden Hyatt
N. PETERS, Photo-Lithographer, Washington, D. C.

4 Sheets—Sheet 4.
T. HYATT.
Assignor to E. A. L. HYATT, (late E. A. LAKE.)
ILLUMINATING ROOFS AND ROOF PAVEMENTS.
No. 9,883. Reissued Sept. 27, 1881.
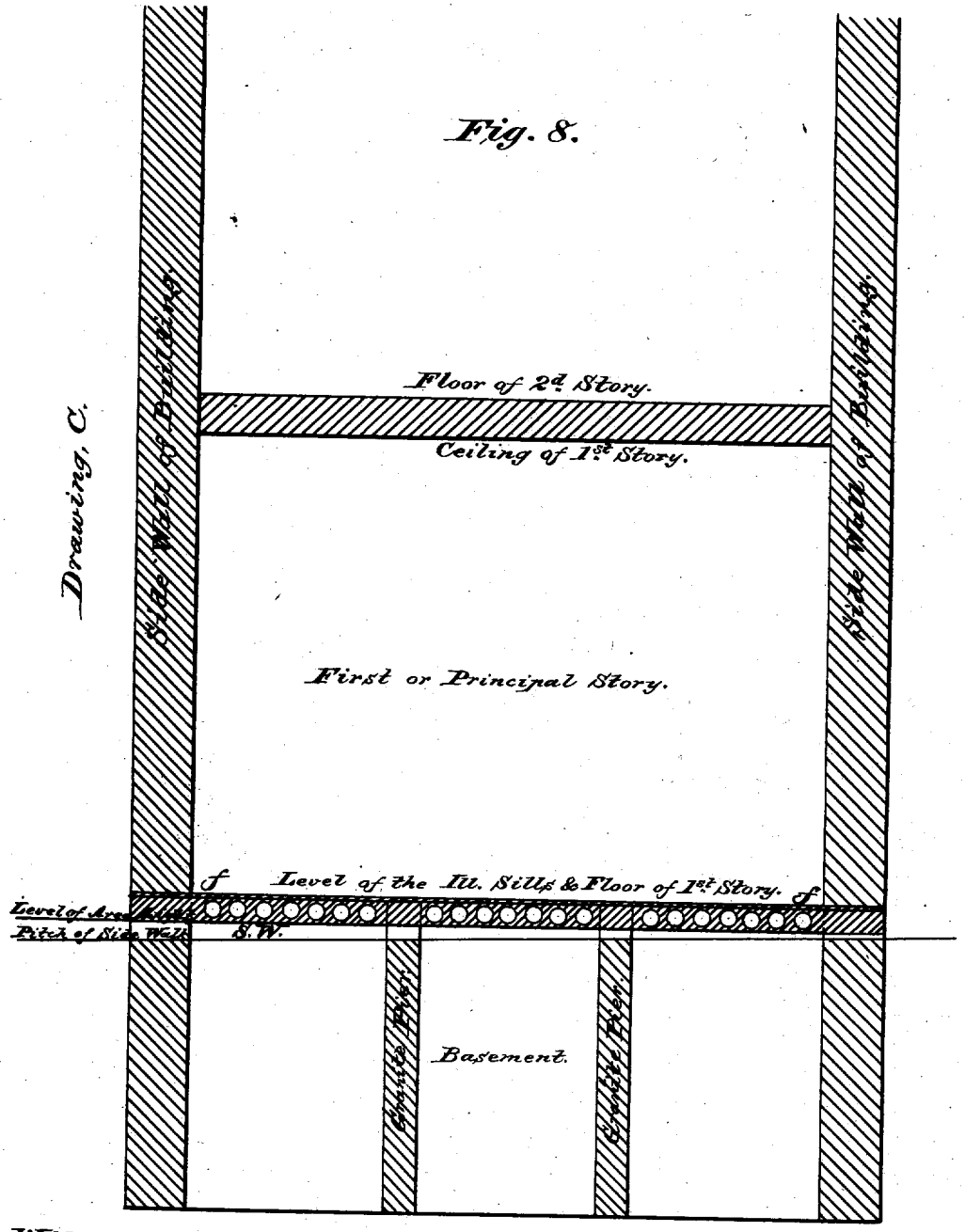
Witnesses:
T. C. Brecht.
J. F. Mallinckrodt.
Inventor:
Thaddeus Hyatt
N. PETERS, Photo-Lithographer, Washington, D. C.

UNITED STATES PATENT OFFICE.

THADDEUS HYATT, OF NEW YORK, N. Y., ASSIGNOR TO ELIZABETH A. L. HYATT, (LATE ELIZABETH A. LAKE.)

ILLUMINATING ROOF AND ROOF-PAVEMENT.

SPECIFICATION forming part of Reissued Letters Patent No. 9,883, dated September 27, 1881.

Original No. 68,332, dated August 27, 1867. Reissue No. 8,363, dated August 6, 1878. Application for reissue filed September 5, 1881.

*To all whom it may concern:*

Be it known that I, THADDEUS HYATT, late of Atchison, Kansas, but now of the city, county, and State of New York, have made certain new and useful Improvements in Illuminating-Roofs and Roof-Pavements, made by constructing and combining my patented vault-covers so as to form roofs by the combination of such strength as to be suitable for sidewalks—that is to say, where the sidewalk serves as a roof to an underground room—of which the following is a specification.

The actual invention—viz., an illuminating-grating, made by me and patented 12th November, 1845—was really a new building material, but as invented at the time was applicable to no purpose other than a vault-cover or coal-hole plate, because, first, of its heavy dead-iron border; second, its shape; and, third, its imperfect mechanical construction in laminæ or layers with the glasses held between the plates, but from its nature capable of being made into a new and useful building material of great value.

My improvements, set forth in the following specification and drawings, consist, first, in perfecting the mechanical construction of the vault-cover in the following particulars, viz: as to making it of a single plate instead of laminæ or layers, as to entering the glasses from the weather-face of the grating, as to fixing each glass independently of every other in the grating, and as to fastening the glasses in the vault cover or grating by means of an instantaneously-setting cement, which I call a "double-cemented joint;" second, converting the perfected vault-cover into an illuminating-tile or building-plate by a removal of the superfluous portion of its dead-iron border; third, combining the perfected vault-covers in tile form with framing into enlarged or extended illuminating-surfaces, as building appliances in architectural constructions; and, fourth, combining the perfected illuminating building appliances with buildings to enlarge and illuminate the structures, make safe as foot-surfaces the illuminating portions thereof, and protect the premises against fire and burglary.

The drawings making part of this specification are lettered A B C D E on sheets 1, 2, 3, 4, and the improvements they illustrate are shown by Figures 1, 2, 3, 4, 5, 6, 7, 8.

*Perfected vault-covers as building plates and appliances.—(Drawings A and E.)*—Letter K on Drawing A, Sheet 1, represents, in plan, the perfected vault-cover in single-plate grating or tile form, shaped as a long and narrow panel, in combination with the frame, the method of making the union being shown in cross-section in Fig. 4, where *f g* represent a double-cemented joint, Fig. 1 representing an illuminating-roof construction made of flat plain tiles, and Fig. 5, Drawing E on Sheet 2, representing the tiles in cross-section, where they are shaped and adapted for making step-roofs, the tiles being formed as treads and risers, the tread, where employed in doorways, as in Fig. 5, becoming an illuminating-sill, making with the riser and area-light shown in Fig. 5 an illuminating-stoop, this stoop forming an illuminating-roof, as may be seen in Fig. 7, Sheet 3, to the sunk area, and a source of light as well to the basement and its extension under the sidewalk, as represented in Drawing B, Sheet 3, where the sidewalk is formed of granite slabs. (Represented in plan on Drawing D, Sheet 2.)

Fig. 1 represents a heavy cast-iron frame, C′ being the front, C″ C″ the ends, and C‴ the rear, of the frame, the average width of the dead-iron border at front and rear being about three inches, and the width of the ends depending on whether they are employed as coping or not. The illuminating-roof is formed in combination with such a frame when to be used as a stoop or area covering. Where a frame twenty-five feet long is required I usually cast it in sections, having the ends of the sections together where they meet, so that when the whole is complete the appearance is like as if it had been cast in one piece, as shown in Fig. 1. The object of this frame in making store-front work is to not only make finished and handsome work, but by means of the nosing, water-back, and cross-bars, with their lugs to furnish the means of making water-tight work able to withstand the hard usage to which store-fronts are subject from casks and heavy packages of merchandise thrown down upon them and tumbled over them. D D are the cross-bars that divide the area-space into sections of a width suited to the width of the tiles, such widths being of preference not greater than twenty inches, each tile filling one space, the length of the space being equal to the width of the area. *d d* are seats in the frame and cross-bars to receive the tiles, *d d* representing the bottom flanges of the cross-bars, as represented more plainly in Fig. 2, where *k k* show the blades or webs of the cross bars or beams, D representing the whole bar or beam. The lugs *e e* are designed for the bolts *h*, (shown in Fig. 4.) F, at the rear of the frame, (better seen in Fig. 3,) is a rising lip or water-back; and G, on the front of the frame, (shown plainly in Fig. 3,) is a nosing. The light-spaces represented in Fig. 1 are seven in number, of which only the center one has a panel in it. This panel or tile is indicated by the letter K, in which the glasses are indicated by the letter N.

Fig. 2 is a longitudinal section of Fig. 1 on the line A *a*. The letter D is designed to indicate the entire cross-bar, as already said; *d*, the bottom flange, and *k* the web.

Fig. 3 is a cross-section of the frame. The letter *l*, at the bottom of the nosing G, is an overlap or drip to cover a joint and prevent leakage, (shown plainly in Fig. 5;) and F is the water-back for a like purpose, also plainly represented in Fig. 5.

Fig. 4 represents a portion of the frame and also a portion of the tile, the object of the drawing being to illustrate the perfected vault-cover as a single-plate grating or tile, show the openings for the glasses made to admit them from the weather-face of the tile, each one held in place by itself and capable of being removed at any time without disturbing the others, show the double-cemented joint used to fix each glass in place, as well as to show how the same kind of a joint is employed with bolts to join grating to grating on bearers or cross-bars, whether the bearers be in the shape of cross-bars or parts of a frame, or whether they be independent pieces, like the rafters of a roof.

In Fig. 4 a sufficiently large piece of a tile, K, is shown, along with a sufficiently large piece of a frame, to represent fully the mode of making a water-tight joint, and at the same time to illustrate the mode of fixing glasses in the grating, C″ being the frame; K, the tile; N, the glass; *f g*, the double-cemented joint in connection with the bolt *h*, and the lug *e* representing the mode of making tight joints between tile and frame, *f* representing the vertical seam of fusible cement, and *g* the putty-bed (colored red,) the joint around the glass N being of the same materials, but the fusible cement here being indicated by the letter *j* and the putty by the letter *i*, the cement, here called "fusible," being a mixture of coal-tar and sulphur, liquid when hot, but having the property of instantaneously setting or cooling, and thus fixing the glass in its seat immediately. The double-cemented joint is designed for work liable to have water standing upon it in pools and for a long time, such as the flat surface of area-lights; but for work in vertical planes, like riser work, I adopt the method illustrated by the rising lip F and the drip *l* on the nosing G, as shown in the step-roof construction in Fig. 5.

Fig. 5, Drawing E, Sheet 2, represents my method of making illuminating step-roofs, where it may be desirable to form the same in the form of a flight of steps, or where, as in stoop construction, the only illuminating-step may be the sill step at the doorways of the building.

Fig. 5 illustrates a sill, a riser, and an area-light as to the mode of uniting them; and Fig. 7, Drawing B, Sheet 3, shows the construction when in position as a portion of the building, the manner of securing a tight joint where the sill-nosing overlaps, the riser being shown by the drip *l* on the nosing G, Fig. 5, and the manner of securing a water-tight joint by the aid of the rising lip F being shown in Fig. 5, where the area-light is joined to the riser. Drawing E represents the rising lip F as though cast upon the illuminating-tile. This is not the usual way. Of preference, I cast it upon the frame, as shown in Fig. 3 on Sheet 1.

In the construction shown in Fig. 5 section of area-light and section of illuminating-sill show the flat work where the double-cemented joint illustrated in Fig. 4 is employed, while the illuminating-riser represents the perpendicular work, wherein the rising-lip and nosing-overlap construction is relied on for tight work, the vertical seams being usually made good with putty or red lead.

The sill-riser represented in Fig. 5 may be seen to good advantage on Sheet 4, Fig. 8, Drawing C, where a front view of the riser is given, and where the light-holes are represented as of a diameter nearly equal to the depth of the riser, this depth varying from three to eight inches, the glasses being correspondingly small or large, the size of the glasses in my perfected vault covers or tiles being in all cases regulated by the user of the tiles and their localities. In the tops and rear extensions of buildings, where the illuminating-roof is designed to protect the premises against fire, as well as burglary, I employ glasses preferably not over four inches diameter, usually making use of three-inch diameters, while in store-floors I sometimes employ glasses nine inches diameter, because all, or nearly all, the light that falls upon them is vertical, whereas, where the light of the heavens can be had at all angles, glasses of two inches are capable of letting in all the light required; and, as in foot-pavements, a multitude of feet pass over them, some of them being the feet of children, I make the glasses of vault-covers for the sidewalks of preference not more than two inches in diameter. I make them small, also, in stoops exposed to hard usage;

dow-shutters and window-guards, the glazed sash-frame being employed merely to shut out the weather, like a translucent curtain, whereas my invention—the illuminating-grating—combines within itself the functions of a glazed sash and a shutter or window-guard, my old vault-covers being the first rabbeted gratings ever invented and made.

As a consequence of the state of the art as I found it, the only resemblance to a basement-extension found by me was where the basement was enlarged by the addition of the narrow sunk area railed off from the footway, and covered over by a "lean-to" skylight made of wood sashes glazed with pane-glass, the feet of the sashes resting against the stone curb of the area and the tops of the sashes resting against the wall of the building.

My invention is an improvement upon this imperfect basement-extension, as my perfected vault-cover is an improvement upon my imperfect invention of 1845.

With the exception above mentioned, there were no other basement-extensions. The vaults used as press-rooms by the newspapers—New York Sun, Herald, and others—were in no sense extensions of basements; neither were they flat-roofed vaults. All the light they received came down long necks, like chimneys, and they had but little in this way. The first thoroughly-lighted vault ever constructed was made so by a sidewalk of my lights, laid by me for the New York Herald building in the year 1850. This enabled me two years later to get the opportunity of putting down an actual basement-extension, taking in all the space under the sidewalk and going two stories underground; but that year, the following, and the next were required in order to perfect the work, so as to secure the public confidence, which was accomplished only when, after repeated failures, I at length succeeded in making water-tight joints that would withstand the effects of both summer and winter weather and concussions of every kind constantly repeated, which I accomplished by means of the double-cemented joint and bolting hereinabove fully explained as to the construction, the fusible cement spoken of as forming the vertical seam of the joint being a mixture of sulphur and coal-tar, in proportions as set forth in my application for patent for same of February, 1854.

A skylight, as I have said, is only a window in a roof, frail and dangerous, as has been fatally proven in New York on several occasions, where firemen have lost their lives by stepping upon them in mistake for the roof, while their inutility as protection against fire, or rather their dangerous character for letting fire into premises, has been of late made manifest, where the insurance companies met with a loss of four hundred thousand dollars directly traceable to a skylight. This loss, occurring within a few weeks of a fire where my roof-lights saved the menaced premises, caused the New York Associated Fire Insurance Companies to put an extra premium of ten per cent. on all buildings using skylights and no extra premium where Hyatt's roof-lights were employed.

Fig. 2 on Sheet 1 may be taken to represent, in cross-section one of my illuminating-roofs, the tile K being supported on the bottom flanges, *d d*, of the rafters D D, *k k* being the blades or webs of the beams. In general these webs of the rafters rise above the work to give greater depth to the beams and make them stiffer and stronger, in this way showing a smooth under face to the work, as is represented in the figure; but for area-light roofs the cross-bars are deepened on the under side for strength.

In my illuminating roof I call the perfected gratings "tiles," as I have already said, to distinguish them from the old vault-covers, and I call them so also because their function is that of a covering to framing or rafters where the two combine to form the roof, for when the tile K is bolted to the rafters it is the actual substance of the roof as much as though it were a solid plate of metal, which it is, but pierced with holes to give light. The strength of this metal plate is therefore the strength of the roof, and the total areal field of light passing through it, instead of all going through one large central opening, thereby creating strong lights and shadows, is divided up into numerous small light-fields all over the entire roof, so distributing the light equally throughout the apartment, with no strongly-contrasted shadows and light. I have also shown how these tiles differ from the old vault-light, where the glasses were confined by being held to their seats between laminæ or plates, in which to repair one a number had to be disturbed, the strength of the grating being at the same time divided between the plates.

My tiles, as illustrated in Fig. 4, Sheet 1, are cast in one plate, with the seats for the glasses in the upper face, so as to be entered from the top side, and each glass by itself is held in position by means of the double-cemented joint, by means of which I get stronger, better, and cheaper lights than before. I also make the tiles in narrow-strips, (as represented in plan, Fig. 1, where K is the tile,) to secure the least possible thickness of iron consistently with their strength, for, the apertures in these gratings being small, the thickness of the tile is a matter of great importance, the spread of the light through them being dependent on their depth as proportioned to their diameters. Narrow tiles are stronger than wide ones of the same thickness, because hot-flowing metal chills in proportion to the smallness of its stream and the distance it travels in the flask. Moreover, in constructing an illuminating-roof where the illuminating-gratings are the covering, and the work is required to have permanent water-tight joints, narrow tiles are better than wide ones of the same thickness, because the supports are thus multiplied, which makes but in others not so exposed the glasses may be larger.

*Improvements in buildings.*—(*Drawings B, C, D.*)—Figs. 6, 7, 8 on Sheets 2, 3, 4 illustrate my improvements in buildings, the chief feature being my invention of an enlarged basement by taking in the space underneath the sidewalk beyond the sunk area, an important part of my invention being the employment of an iron girder as a substitute in place of the area-wall, the web of the girder being employed as a riser for the area-light, thus increasing the light-space of the area from ten to twenty per cent.

Fig. 6, Drawing D, Sheet 2, represents, in plan, four granite slabs, (seen in cross-section in Fig. 7, Sheet 3,) as constituting the footway of the street, and at the same time the roof to the under sidewalk room or extension of the basement. The design of the construction is to unite a flat-roofed sidewalk with the area-light and the door-sills as one continuous water-tight roof to the portion of the basement extended out underneath it, saving the expense of doors and windows between the granite piers, making the whole space into one well-lighted apartment, so that as a roof the stoop and street-footway become portions of the building, all which I accomplish by means of the detailed portions of my invention hereinabove set forth and illustrated—the double-cemented joint, bolting and bedding of the tiles, the rising lip, and the nosing with its drip—and putting all together as building construction, combined with the iron girder mentioned. In effecting all this I employ at the doorways the sill frames *d s*, which, at their ends, are let into the granite piers G P, as shown in Fig. 6, and bolted fast both to the piers and the side walls of the building, interlocking the whole, so that when the illuminating-riser is in place and bolted fast to the sill in manner as represented in Fig. 5, the riser running across the face of all the piers and being in length equal to the width of the building, as shown in Fig. 8 on Sheet 4, and the area-light or stoop is then bolted fast to the sill-riser, as shown in Fig. 5, and the area-light is fastened to the iron girder T, as shown in Fig. 7 on Sheet 3, where the nosing of the stoop overlaps the riser-web of the beam, and the granite slabs are in turn connected with the iron girder T by resting upon the bottom flange of same, and, having all its joints made water-tight, a complete and perfect water-tight roof is made over the extended basement.

Fig. 7 shows the area-light roof in position as a connection between the granite sidewalk and the doorways of the building in the nature of a translucent bridge, P S being the ground floor or principal story; *f*, the floor, showing its level above the sidewalk; B, the basement; A, the area; V S, the vault-space, here changed into basement-room space; T, the iron girder laid parallel with the face of the building; W, the web of the girder, here shown as the stoop-riser. The dotted lines represent the light-rays, that enter the basement as angular direct rays and as reflected rays from the white walls of the chamber under the sidewalk.

Fig. 8, Drawing C, Sheet 4, represents the front of a building where the space between the piers is open, and is designed by showing the pitch of the sidewalk to illustrate the use of the iron girder T and the mode of its construction under such circumstances, which is to make the web of the girder greater in depth at one end than the other, the difference between the level of the area light and the pitch where it is greatest showing the difference in the depth of the web of the girder between its ends, the level for the area-light where it rests upon the top of the web of the girder being horizontal, and the level where the granite slabs rest upon the bottom flange of the girder being inclined to this.

The purpose of this part of my invention is to change the use of the space underneath the sidewalk (where it can be most easily lighted) from coal-vaults (which can as well be made in the dark portions of the building) into finished apartments, capable of becoming a portion of the basement and valuable as a sales-room. This purpose I effect mainly by the area, which, by the old method of building, was a chasm to separate, but by my method becomes a bond to unite, the two, and this bond is effected because my illuminating roof to the area is also a roof-pavement—that is to say, a surface of glass and iron suitable for being walked upon.

I do not claim to be the first to enlarge the basement by taking into it the area space, nor the first to incorporate the area into the basement by a glass covering; but my construction does not barricade the doorways of the buildings. It is rather a bridge than a barricade, for it joins the footway to the house and keeps open the communication, as will be better understood by considering the art as I found it. The only glass employed for being walked upon was made at that time in molds, called "flint" or "pressed" glass, and the only known mode of using this glass was the deck-like method, where an opening in the deck is closed by a block of glass the size of the opening. Consequently, when glasses to be put into floors were wanted and deck-lights were too small to suit, expensive slabs of glass, three inches thick and twenty inches square, were employed, each glass fitting its opening in the floor like the deck-light in a vessel's deck. Where this mode was not resorted to, open iron gratings were employed in the floors, with window-sashes placed below to catch the dust and dirt. Such was the art as to glass to be walked upon. For windows—and skylights are windows in a roof—the art consisted then, as now, in using the frame of sash bars as a device to save the expense of one large glass, the strength of the sash-bars being with reference merely to supporting the glass, not to guard the window-opening, this function being delegated to wina stiffer roof, and thus renders the water tight seams less liable to be broken.

A part of my invention in relation to the grating I have said consists in making it with as little dead-iron border as possible, in which form I term it an "illuminating-tile," and represent the same in Fig. 1 by the letter K. The border of the grating is made with as little bulk of metal as possible, not alone to avoid loss of light-space, but to prevent the tile from cracking in cooling when cast, as it would be liable to do were the border a very heavy one. This construction of the tile calls for a narrow seat in the frame, and this in turn makes the lugs necessary, which are projecting eyes that come out into the light-space just under the tile, where the metal is greatest between the glasses, and gives an opportunity for bolting, the bolting of the tiles, in connection with the double-cemented joint, being necessary to get the wind out of the tile, it being practically impossible to make the tiles perfectly level and true. This also renders important the bedding of the tile upon a soft and yielding waterproof substance, like putty, and as it requires a long time for the putty to harden and dry, I employ the fusible cement to secure the instantaneous water-tight joint. Thus the lug, the bolts, the narrow-bordered tile, the narrow-seated frame, and the double-cemented joints are all important in a combination where each is mutually dependent on the other, and all this taken together forms a part of my invention, the separate and distinctive features of the constructions or appliances being the two divisions of light-gratings formed by themselves, and the heavy parts as borders and supports formed by themselves, and then the union of the two to get the perfected construction.

Having thus fully described and illustrated my invention under its fourfold aspect with respect to, first, perfecting the mechanical construction of the grating as a vault-cover; second, converting the vault-cover into an illuminating grating or building-tile; third, combining the improved tiles into enlarged illuminating-surfaces as building appliances; and, fourth, combining the illuminating appliances with buildings in the construction of improved illuminated buildings, what I claim as my invention, and desire to secure by Letters Patent, is—

1. An illuminating-grating vault-cover formed in a single plate or layer, as opposed to a grating made with cap-plates or in laminæ or layers, substantially as and for the purposes herein set forth and illustrated.

2. Single-plate illuminating-grating vault-covers formed with apertures blocked with glasses, set each independently of the other, by means of a bonding-cement put between the sides of the glasses and the sides of the apertures in the grating, such bonding-cement having the property of setting and hardening in a practically instantaneous manner and forming a water-tight joint around the glass, substantially as and for the purposes herein set forth and illustrated.

3. Combining the glasses of an illuminating-grating with the metallic portion thereof by means of a double-cemented joint, substantially as and for the purposes herein set forth and illustrated.

4. An illuminating-tile as a new building material, constructed substantially as and for the purposes herein set forth and illustrated.

5. Illuminating roofs and roof-pavements as building appliances formed by combining perfected vault-covers or illuminating-tiles as a new building material, substantially as and for the purposes herein set forth and illustrated.

6. Improved buildings made by combining illuminating roofs and roof-pavements as building appliances with the main structure of the building as integral portions thereof, substantially as and for the purposes herein set forth and illustrated.

7. Buildings in which the approaches over the areaway to its doorways from the sidewalk or traveled footway of the public street are formed by means of a solid water-tight translucent bridging of iron and glass, which serves the double purpose of stoop and roof, substantially as and for the purposes herein set forth and illustrated.

8. Buildings in which the area-space is made to become a portion of the basement by means of a water-tight roof of iron and glass constructed as a platform or stoop to be walked over, substantially as and for the purposes herein set forth and illustrated.

9. Buildings in which the basement is enlarged by the union of the vault or coal-hole space with the areal space as an open chamber, and uniting or combining the two with the basement, substantially as and for the purposes herein described and illustrated.

10. Buildings in which the areal and vault space are united by means of an iron girder, the bottom flange of which supports the granite slabs or sidewalk, and the web of which, serving as a riser, supports the area-lights or illuminating-platform, substantially as and for the purposes herein described and illustrated.

11. Buildings in which the sunk areas are covered or roofed with iron and glass in stoop or platform shape for being walked over, where the metallic portions are formed, joined, and made water-tight by means of rising lips or water-backs, and by means of nosings made with an overlap or drip, substantially as and for the purposes herein set forth and illustrated.

12. Buildings in which the sunk areas are roofed with iron and glass in stoop or platform shape for being walked over, where the tiles or metallic parts that support and carry the glass are cast or made separately from the rafters or framing that support them and the two are united by means of a double-cemented joint or its equivalent, substantially as and for the purposes herein set forth and illustrated.

13. Buildings in which the sunk areas are roofed over with iron and glass in stoop or platform manner for being walked over, where the metal tiles or glass carriers are united to each other or to framing by means of mastic bedding and vertical cement-filling, combined with bolting, substantially as and for the purposes herein set forth and illustrated.

14. Buildings in which the sunk areas are roofed over with iron and glass in stoop or platform manner for being walked over, where the areal light-space is enlarged by the employment of an iron girder, beam, or supports laid parallel with the face of the building, in lieu of an area wall and coping, substantially as and for the purposes herein set forth and illustrated.

15. An illuminating-roof of metal and glass, where the metal surface or plate that carries the glasses, and in which they are fixed and made water-tight, forms the general strength as well as roof-surface, in combination with the rafters, supports, or framing, the construction being such as to secure the twofold object of equalizing and distributing the strength of the iron while equalizing and distributing the light of the glasses, substantially as herein set forth and illustrated.

16. An illuminating step-roof composed of glass and metal—that is to say, where the metal and glass are composed into illuminating-sills and illuminating-risers, and these are again combined to form an illuminating-roof—substantially as and for the purposes herein set forth and illustrated.

THADDEUS HYATT.

Witnesses:
JUSTUS BRAUER,
T. C. BRECHT.